United States Patent [19]

Gely

[11] Patent Number: 4,815,281

[45] Date of Patent: Mar. 28, 1989

[54] AIR TAKE-OFF FOR A TURBOJET ENGINE COLD FLOW DUCT

[75] Inventor: Jean-Marie L. Gely, Le Havre, France

[73] Assignee: Societe Nationale d'Etude et de Construction de Moteurs d'Aviation (SNECMA), Paris, France

[21] Appl. No.: 5,121

[22] Filed: Jan. 20, 1987

[51] Int. Cl.⁴ .............................................. F02K 3/04
[52] U.S. Cl. .................. 60/226.1; 60/226.2; 60/39.07
[58] Field of Search ............... 60/226.2, 229, 262, 60/39.07, 757, 39.83, 226.1; 239/265.27, 265.29, 265.31, 265.33; 137/15.1, 15.2; 244/53 B, 110 B

[56] References Cited

U.S. PATENT DOCUMENTS

| 650,535 | 5/1900 | Hickey | 60/229 |
|---|---|---|---|
| 2,635,419 | 4/1953 | Ambrose et al. | |
| 3,464,705 | 9/1969 | Ryan | |
| 3,511,441 | 5/1970 | Tumicki | 239/265.29 |
| 3,680,309 | 8/1972 | Wallace, Jr. | 60/39.07 |
| 3,695,387 | 10/1972 | Hilbig | 239/265.29 |
| 3,739,582 | 6/1973 | Maison | 60/226.2 |
| 3,779,010 | 12/1973 | Chamay et al. | 60/226.2 |
| 3,964,257 | 6/1976 | Lardellier | 60/226.2 |
| 4,355,507 | 10/1982 | Coffey et al. | |
| 4,485,630 | 12/1984 | Kenworthy | 60/757 |
| 4,527,397 | 7/1985 | Tobery et al. | 60/757 |
| 4,653,279 | 3/1987 | Reynolds | 60/757 |

FOREIGN PATENT DOCUMENTS

| 2745131 | 4/1979 | Fed. Rep. of Germany | 60/226.1 |
|---|---|---|---|
| 929925 | 1/1948 | France | |
| 1080835 | 12/1954 | France | 239/265.27 |
| 2490731 | 9/1980 | France | |
| 577365 | 5/1958 | Italy | 239/265.27 |
| 723406 | 2/1955 | United Kingdom | |
| 858525 | 1/1961 | United Kingdom | |
| 1114147 | 5/1968 | United Kingdom | |

Primary Examiner—Donald E. Stout
Attorney, Agent, or Firm—Bacon & Thomas

[57] ABSTRACT

A wall of a multi-flow turbojet-engine thrust-reverser cold-flow duct defines an air intake for a main air take-off ($F'_1$) and an additional secondary air takeoff ($F'_2$) which assures the suction of the boundary layers of the flow. The secondary air takeoff may consist of a transverse slit. The takeoffs may be used to supply cooling, pressurizing or ventilating air to the airplane or hot engine part.

11 Claims, 4 Drawing Sheets

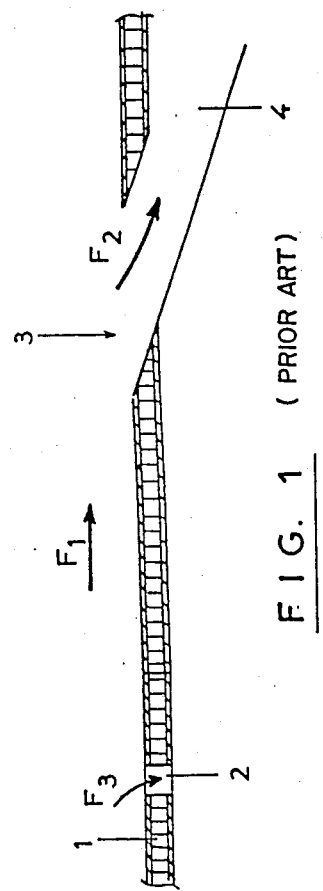
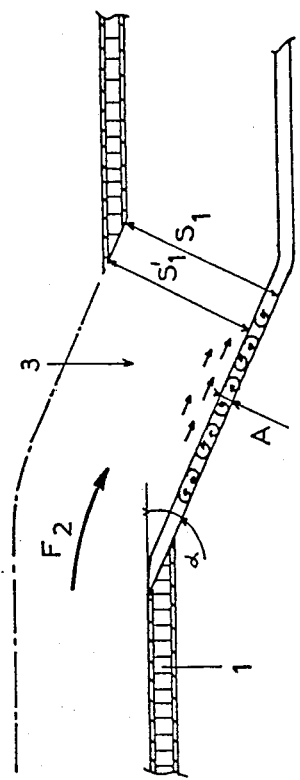
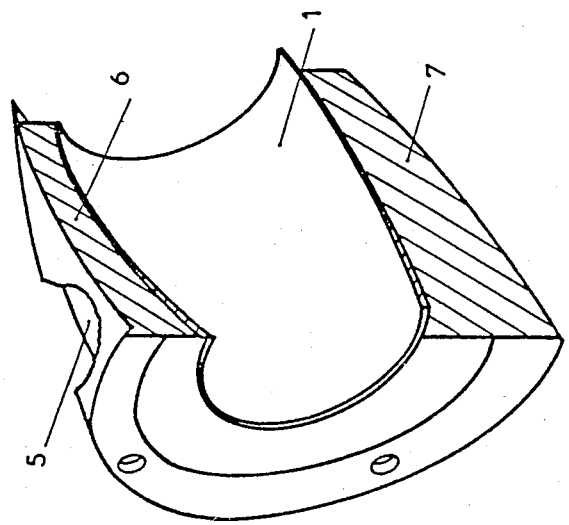

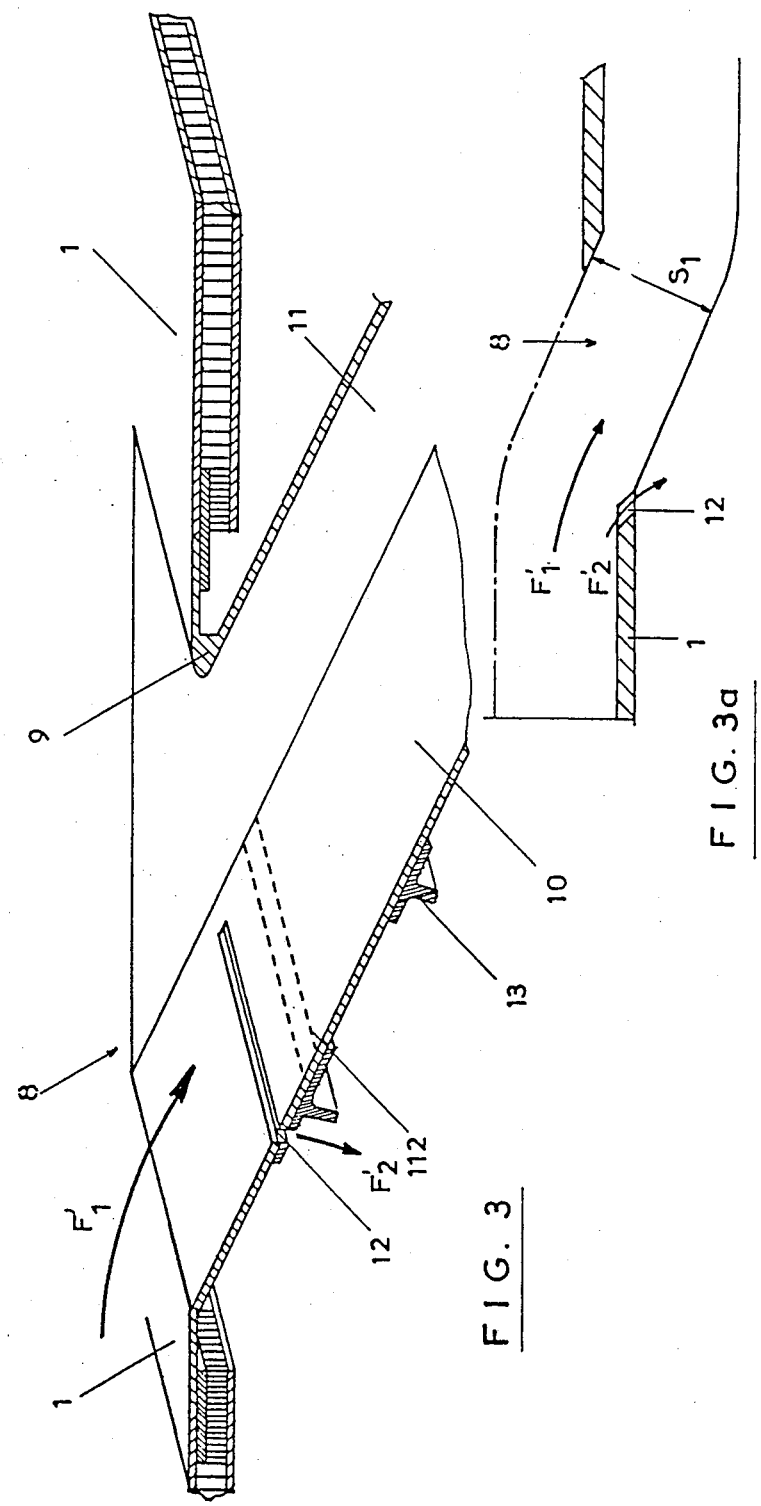

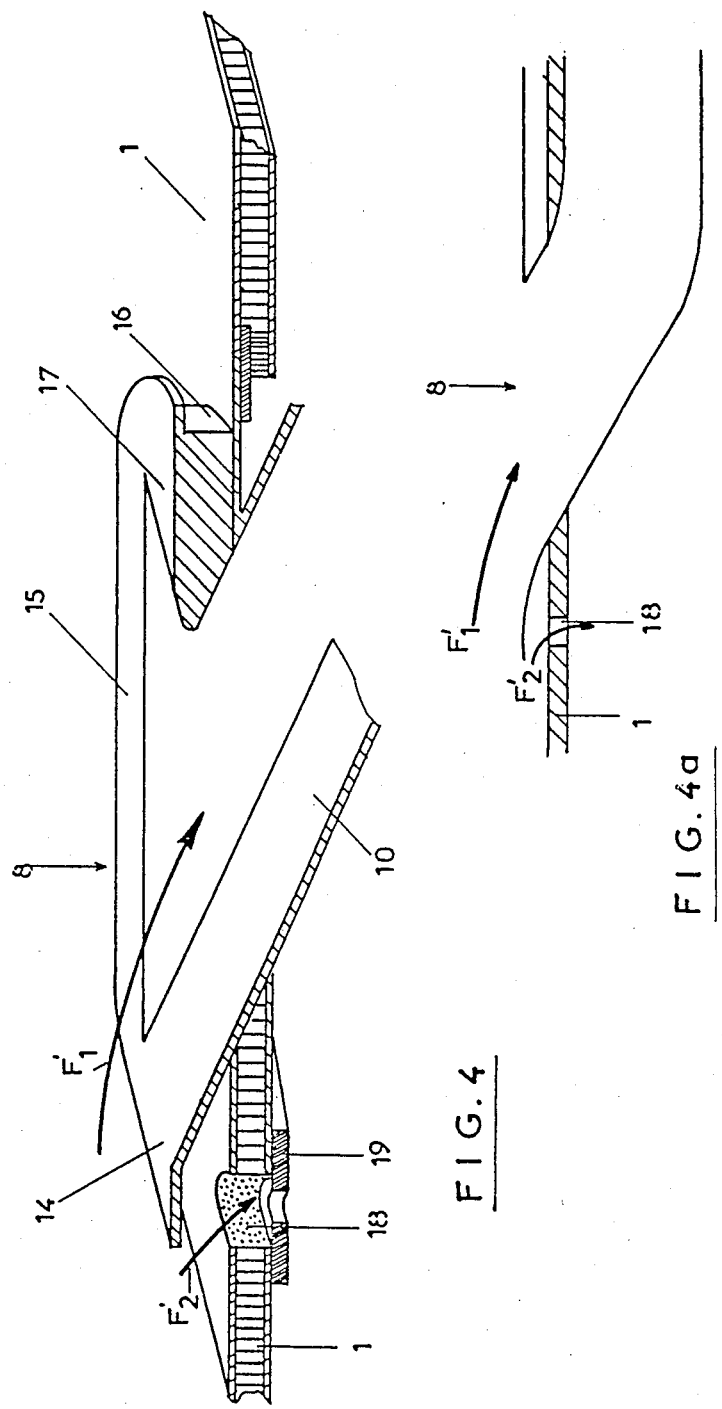

AIR TAKE-OFF FOR A TURBOJET ENGINE COLD FLOW DUCT

BACKGROUND OF THE INVENTION

The invention concerns a multiflow turbojet-engine thrust-reverser cold-flow duct equipped with a system of combined air takeoffs.

The search for high performance in modern turbojet engines has led to high operational temperatures which, in turn, require air cooling of various engine parts undergoing strong stresses or located in especially hot zones. As regards the turbojet engines of which the applications require a thrust reverser which may, in particular, be associated with the cold flow of fan engines, it is conventional to tap or withdraw air from the cold-flow duct of the thrust reverser. Illustratively the French patent No. A 2 490 731 describes the overall structure of a thrust reverser mounted on the cold-flow duct of a multiflow turbojet engine.

These air takeoffs as a rule are distributed longitudinally (as seen along a generatrix of the cold-flow duct) along the duct wall, depending on the use of the tapped air. Accordingly, the duct wall comprises orifices which are distributed peripherally and which ensure the ventilation of the hot compartment between the wall of the cold-flow duct and the casing of the inside engine, where this wall constitutes the housing of the turbojet engine gas generator. In this manner, the inner surface of said wall is cooled as well as the outer surface of said housing and the various accessories typically mounted on it. The duct may be provided with air intakes of diverse types, such as those which are flush or are dynamic scoops and from which a conduit guides the tapped air to one of the selected points to be cooled. For instance, the air maybe directed to where the engine turbine is located; to ventilate the engine pod; or ventilate the aircraft in general after having crossed a heat exchanger wherein circulates the high-pressure air tapped for the needs of the aircraft. These takeoffs may be located in any of the walls of the reversing duct: inner wall; outer wall; upper or lower divider. In these known devices, the air is tapped individually.

FIG. 1 schematically shows such a design wherein 1 is the radially inner wall of a thrust-reverser cold-flow duct. Holes 2 are present in this wall and downstream, and longitudinally apart, there are flush air intakes 3 extending into a conduit 4 guiding the tapped air toward zones in the aircraft or onto engine parts which are to be cooled, ventilated, or pressurized. The arrow F1 denotes the flow in the duct, the arrow F2 the main takeoff implemented through the air intakes 3 and the arrow F3 the secondary takeoff through the holes 2. The secondary air takeoff F3 through the holes 2 is used in particular to ventilate the housing in which the gas generator or primary part of the turbojet engine is located.

These known designs suffer from drawbacks due to the persistency of viscous boundary layers in the tapped air flows, whereby much of the effectiveness is lost in cooling or ventilating. FIG. 1a schematically shows an air intake 3 wherein a slope, desired to be larger than 15° to improve tapping efficiency, generates turbulent boundary layers. It will be noted that the effective cross-section $S'_1$ is reduced in relation to the theoretical takeoff cross-section S. Indeed, the average pressure over the height of the tapped fluid flow also is lowered by the boundary layers of which the flow rates and total pressures are decreased. The overall performance of the unit therefore is decreased. The object of the invention is to avert these drawbacks.

SUMMARY OF THE INVENTION

A thrust-reverser cold-flow duct for a multiflow turbojet engine of the above type is characterized in the invention by a first means consisting of an air intake which is the main takeoff and with which is associated within the same zone of the cold flow duct a second means for drawing in the boundary layers of the flow so as to form a secondary takeoff.

Advantageously, the second means may consist of a transverse slit in the floor of a main air takeoff intake with walls flush with the duct wall.

In another embodiment, the air intake of the main air takeoff comprises a projecting spoiler associated with lateral side fairings,, a rear fairing and a front row of holes in the duct wall upstream of said spoiler constituting the second takeoff.

Other advantages and features of the invention shall be more clearly understood in the light of the description of the embodiments of a thrust-reverser cold-flow duct of a multiflow turbojet engine equipped with an apparatus for combined air takeoffs of the invention.

BRIEF DESCRIPTION OF THE DRAWINGS

FIG. 1 is a partial, schematic view of a cold-flow duct of a known type.

FIG. 1a is a schematic view of a fluid flow tapped by the device of FIGURE 1.

FIG. 2 is a schematic perspective view of half a cold-flow duct of a thrust reverser.

FIG. 3 is a partial schematic view along a longitudinal section through the axis of the turbojet engine, showing the cold-flow duct of a thrust reverser with the combined air takeoff means, according to a first embodiment of the invention.

FIG. 3a is a schematic view of a tapped fluid flow of the apparatus of FIG. 3.

FIG. 4 is a partial schematic view similar to FIG. 3 showing a second embodiment of the invention.

FIG. 4a is a schematic view of a tapped fluid flow in the apparatus of FIG. 4.

DETAILED DESCRIPTION OF THE PREFERRED EMBODIMENTS

Figure 1B:
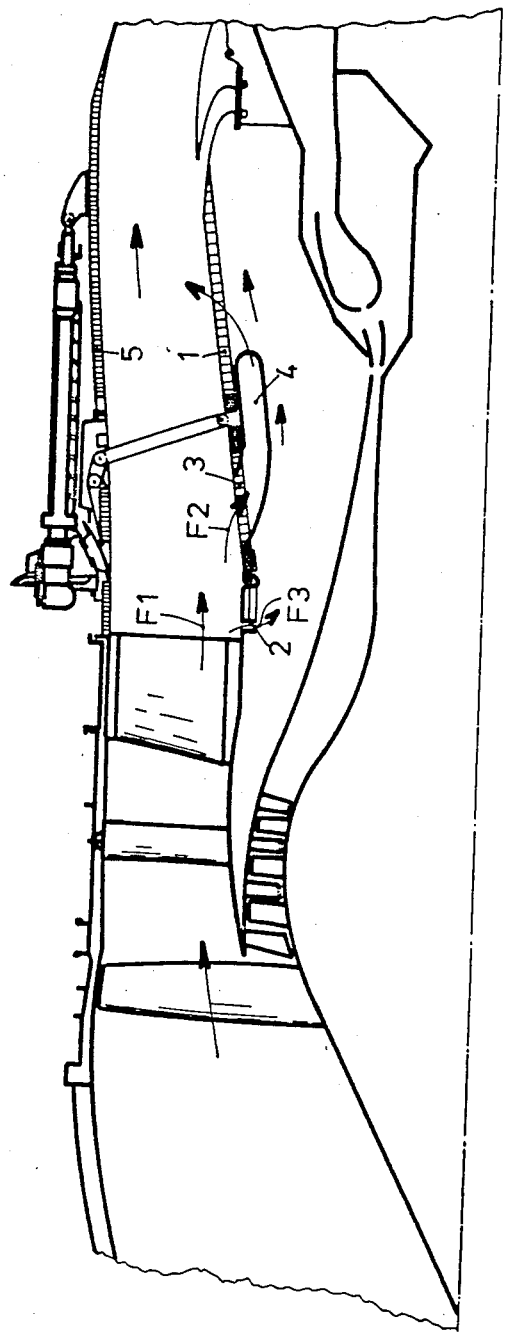
FIG. 1b is a partial, longitudinal sectional view illustrating the known cold-flow duct structure.

As shown in the schematic drawing of FIG. 2, a thrust-reverser cold-flow duct of a multi-flow turbojet engine comprises a radially inner wall 1 and a radially outer wall 5. The shown reversing duct is the "C duct" type, only half being shown. The walls 1 and 5 are joined into a C at the upper part by a vertical connecting wall 6 called the upper divider and at the lower part by a vertical connecting wall 7 called the lower divider. The two radially inner walls 1 of the C units form a primary cowl constituting the outer housing of a hot compartment receiving the gas generator or primary part of the turbojet engine (omitted from the drawings).

In a first embodiment of the invention and shown in FIG. 3, an air intake 8 with parallel walls is present in the inner wall 1 of the cold-flow duct. Air intake 8 joins the wall 1 by flush lip 9, the partial drawing of this Figure also showing a floor 10 and a sidewall 11. A transverse slit 12 is defined in the floor 10 a short distance from the intake. The boundary layers closest to the floor 10 are drawn through this slit 12 in the main takeoff F'$_1$ through the slit 12 which can be used for ventilating the hot compartment between the wall 1 the turbojet engine gas generator within it. Near the slot 12 and downstream in relation to the circulation of the main takeoff F'$_1$, the floor 10 comprises on its outer surface one or more transverse reinforcements 13 constituting a deflector means for the flow of the secondary takeoff F'$_2$. Other uses are also possible for the secondary takeoff F'$_2$. In particular, the slit 12 may be connected to a conduit for guiding this flow to zones to be ventilated or cooled, illustratively near the hot engine parts or hot control means.

FIG. 3a schematically shows the effect of the secondary takeoff F'$_2$ and how it affects the main takeoff F'$_1$. Because the takeoff area is moved away from the wall 1, the average pressure across the tapped flow cross-section exceeds that for the prior art devices shown in FIG. 1 and FIG. 1a. In this takeoff area, the speed profile is more regular and the speeds are higher than near the wall. The perturbations of FIG. 1a are avoided and in the air intake 8, the flow is reattached to the wall beyond the slot 12 of the secondary takeoff F'$_2$ and again there is a fully collecting effective cross-section S$_1$. Rather than being parallel, the walls of the air intake 8 may be divergent, furthermore they may be plane or curved.

Rather than being transverse to the main flow direction F'$_1$, as shown in FIG. 3, the slit 12 may be oriented differently depending on the flow characteristics observed and the desired effect from the secondary takeoff F'$_2$. Depending on those characteristics, the slit also may be located in another wall of the air intake 8. A movable diaphragm regulating the flow may be associated with the slit 12. One or more rows of holes in the floor 10 may be substituted for the slit 12 and are shown as thin dashed lines 112 in FIG. 3.

The secondary takeoff F'$_2$ also can be carried out at a guide conduit for the air of the main takeoff F'$_1$ beyond the air intake 8.

In a second embodiment of the invention shown in FIG. 4, the floor 10 of the air intake comprises a part projecting into the cold flow duct beyond the wall 1 at the intake to form a spoiler 14 cooperating with lateral side fairings 15 connecting it to a rear fairing 16. The air intake 8 is joined by a raised lip 17 to the wall 1. In this arrangement, the main stream of the cold flow in the duct when making contact with the radially inner wall 1 will be deflected by the spoiler 14, channelled by the lateral side fairings 15 and ejected by the rear fairing 16 from which a mixture with the main flow is then obtained. In order to reduce the deleterious wake effect produced on the main stream of the cold flow, the rear fairing 16 is contoured in such a manner that it properly connects to the wall 1.

Near the upstream spoiler 14, the wall 1 defines a front row of holes 18 drawing in part of the boundary layers of the main flow so as to constitute a secondary takeoff with the same applications as in the first embodiment, in particular for ventilating the hot compartment located between the radially inner wall of the cold-flow duct and the turbojet engine gas-generator.

FIG. 4a shows schematically the air intake 8 and main takeoff stream F'$_1$ which, as in the first embodiment, is away from the wall 1, shifting thereby the takeoff into an area where the flow speeds are higher, whereby the average pressure in the tapped stream also will be higher.

This second embodiment offers the advantage of an improved air flow by more effectively eliminating the boundary layers, so that improved performance is obtained by the takeoffs and by the main flow. This embodiment also offers improved elimination of spurious elements degrading the effective use of the takeoffs (moisture, dust, foreign bodies).

As above, diverse variations of the embodiments are possible. In particular, the secondary takeoffs which are always directly combined with the main takeoff may be variously located, to the side or to the rear of the air intake and diverse equivalent takeoff means, for instance slots or orifices, may be used.

Again as in the first embodiment, flow regulation may be associated with the secondary takeoff means. FIG. 4 illustratively shows a movable plate 19 with calibrated holes associated to the suction holes 18.

Moreover a complementary takeoff slit 12 such as is used in the first embodiment can be combined with the devices of the second embodiment just described.

The foregoing description is provided for illustrative purposes only and should not be construed as in any way limiting this invention, the scope of which is defined by the appended claims.

What is claimed:

1. In a cold flow duct of a multi-flow turbojet engine defined by an outer wall, an inner wall, and upper and lower divider walls, wherein air flows from an upstream direction toward a downstream direction, the improvements comprising:
   (a) main air takeoff means communicating with the cold flow duct through the inner wall so as to draw off a portion of the air flowing through the cold flow duct, the main air takeoff means having an intake in a first radial location and having a furthermost upstream portion and,
   (b) secondary air takeoff means located adjacent to and downstream of the furthermost upstream portion of the intake of the main air takeoff means to withdraw air therethrough so as to minimize a turbulent boundary layer flow in the main air takeoff means, the secondary air takeoff means being in a second radial location radially displaced from the first radial location.

2. The improved cold flow duct according to claim 1 wherein the intake of the main air takeoff is substantially flush with an inner surface of the inner wall of the cold flow duct.

3. The improved cold flow duct according to claim 2 wherein the main air takeoff means comprises a conduit having a floor, an opposite wall and side walls inerconnecting the floor and opposite wall.

4. The improved cold flow duct according to claim 3 wherein the secondary air takeoff means is defined by the floor of the main air takeoff conduit.

5. The improved cold flow duct according to claim 4 wherein the secondary air takeoff means comprises a transverse slit defined by the floor of the main air takeoff conduit.

6. The improved cold flow duct according to claim 4 wherein the secondary air takeoff means comprises at least one transverse row of holes defined by the floor of the main air takeoff conduit.

7. The improved cold flow duct according to claim 4 further comprising a transverse reinforcement member attached to an outer surface of the floor of the main air takeoff conduit.

8. The improved cold flow duct according to claim 1 further comprising means defining the intake of the main air takeoff extending inwardly into the cold flow duct.

9. The improved cold flow duct according to claim 8 wherein the means defining the intake of the main air takeoff comprises an upstream spoiler defining the furthermost upstream portion, lateral side fairings and a rear, downstream fairing so as to deflect the turbulent boundary layer.

10. The improved cold flow duct according to claim 9 wherein the secondary air takeoff means comprises a row of holes defined by the inner wall and located adjacent the upstream spoiler.

11. The improved cold flow duct according to claim 10 further comprising regulating means to regulate the amount of air passing through the secondary air takeoff means.

* * * * *

UNITED STATES PATENT AND TRADEMARK OFFICE
CERTIFICATE OF CORRECTION

PATENT NO. : 4,815,281

DATED : March 28, 1989

INVENTOR(S) : Jean-Marie L. GELY

It is certified that error appears in the above-identified patent and that said Letters Patent is hereby corrected as shown below:

On Col. 4, claim 3, line 54, "inerconnecting" should be --interconnecting--.

Signed and Sealed this

Twenty-sixth Day of September, 1989

Attest:

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO. : 4,815,281
DATED : March 28, 1989
INVENTOR(S) : Jean-Marie L. Gely

It is certified that error appears in the above-identified patent and that said Letters Patent is hereby corrected as shown below:

On the title page assignee should read

--(73) Assignee: Hispano-Suiza, Saint Cloud, France--.

Signed and Sealed this

Thirteenth Day of February, 1990

Attest:

JEFFREY M. SAMUELS

Attesting Officer   Acting Commissioner of Patents and Trademarks